(12) United States Patent
Chomard et al.

(10) Patent No.: US 7,105,104 B2
(45) Date of Patent: Sep. 12, 2006

(54) METHOD FOR MAKING A QUASI-INCOMPRESSIBLE PHASE-CHANGE MATERIAL WITH LOW THERMAL CONDUCTIVITY, AND RESULTING PRODUCT

(75) Inventors: Angèle Chomard, Paris (FR); Jean-Claude Hipeaux, Colombes (FR); Jacques Jarrin, Nanterre (FR)

(73) Assignees: Bouygues Offshore, Montigny-le Bretonneux (FR); Institut Francais du Petrole, Rueil Malmaison Cedex (FR)

( * ) Notice: Subject to any disclaimer, the term of this patent is extended or adjusted under 35 U.S.C. 154(b) by 173 days.

(21) Appl. No.: 10/276,804

(22) PCT Filed: Apr. 24, 2001

(86) PCT No.: PCT/FR01/01244

§ 371 (c)(1),
(2), (4) Date: Jun. 6, 2003

(87) PCT Pub. No.: WO01/88057

PCT Pub. Date: Nov. 22, 2001

(65) Prior Publication Data

US 2004/0030016 A1 Feb. 12, 2004

(30) Foreign Application Priority Data

May 19, 2000 (FR) .................................. 00 06489

(51) Int. Cl.
*C09K 5/06* (2006.01)
*E21B 36/00* (2006.01)
*F16L 59/14* (2006.01)
*F16L 59/00* (2006.01)

(52) U.S. Cl. .................... 252/70; 252/62; 165/104.15; 165/104.17; 165/104.21

(58) Field of Classification Search .................. 252/70, 252/62; 165/10, 104.17, 104.21, 104.15
See application file for complete search history.

(56) References Cited

U.S. PATENT DOCUMENTS

| | | | | |
|---|---|---|---|---|
| 5,370,814 A | * | 12/1994 | Salyer | 252/70 |
| 6,000,438 A | | 12/1999 | Ohrn | 138/149 |
| 6,108,489 A | * | 8/2000 | Frohlich et al. | 392/346 |
| 6,482,332 B1 | * | 11/2002 | Malach | 252/70 |
| 2002/0060063 A1 | * | 5/2002 | Neuschutz et al. | 165/61 |
| 2004/0084658 A1 | * | 5/2004 | Ottinger et al. | 252/500 |

FOREIGN PATENT DOCUMENTS

| | | | |
|---|---|---|---|
| DE | 19813562 | | 11/1998 |
| DE | 010102250 A1 | * | 1/2002 |
| EP | 412021 | | 2/1991 |
| EP | 000431398 A2 | * | 6/1991 |
| WO | 9747174 | | 12/1997 |

* cited by examiner

*Primary Examiner*—Anthony J. Green
(74) *Attorney, Agent, or Firm*—Antonelli, Terry, Stout and Kraus, LLP.

(57) ABSTRACT

A method for making a quasi-incompressible phase-change material (PCM) having low thermal conductivity includes combining with a phase-change material (PCM) in liquid state a thickening agent selected to reduce significantly thermal convection, the formed material having, depending on the combinations performed, a gelled structure or a colloidal dispersed system. The PCM may be a mixture of chemical compounds of the family of alkanes, paraffins, waxes, fatty alcohols, fatty acids and the like, and the thickening agent may be organic (aromatic ureas), organo-metallic (alkaline or alkaline earth soaps) or purely inorganic (silica, silico-aluminates such as bentonite made oleophilic). The material is useful for thermal isolation of containers or pipes, and in particular for thermal insulation of hydrocarbon carrying pipes.

9 Claims, No Drawings

US 7,105,104 B2

METHOD FOR MAKING A QUASI-INCOMPRESSIBLE PHASE-CHANGE MATERIAL WITH LOW THERMAL CONDUCTIVITY, AND RESULTING PRODUCT

FIELD OF THE INVENTION

The present invention relates to a process for producing a quasi-incompressible and low thermal conductivity material based on phase-change materials (PCM), products obtained with the process and applications.

The material according to the invention can be used as a thermal insulant in many spheres, notably for thermal insulation of pipes carrying fluids likely to undergo great changes of state under the influence of temperature: paraffin crystallization, hydrate deposition, ice formation, etc.

This is for example the case in the sphere of hydrocarbon production. Thermal insulation of subsea pipes notably turns out to be necessary in many cases to keep the fluids flowing and to prevent as long as possible the formation of hydrates or of paraffin-rich or asphaltene-rich deposits. The development of deep-sea oil fields often combines these drawbacks which are particularly tough in case of production stops.

BACKGROUND OF THE INVENTION

Various thermal insulation techniques are described for example in the following documents: FR-98/16,791, JP-2, 176,299, or WP-97/47,174.

Thermal insulation can be obtained with various processes. Cellular or woolly porous solid materials that block the convection of low thermal conductivity gas are used onshore or in shallow water. The compressibility of these porous materials does not allow this technique to be implemented at relatively great depths.

Another well-known technique consists in coating the pipe with a first layer of a paraffin-imbibed porous material for example, whose thermal insulation coefficient is lower than that obtained with the gas trapping technique reminded above, and with a second layer of a refractory material that reinforces the effect of the first layer. However, such a solution cannot be used in water.

Other solutions are more suitable for use at great depths of immersion. The following materials can be used for example:

- coatings made of quasi-incompressible massive polymeric materials based on polyurethane, polyethylene, polypropylene, etc., which however exhibit a rather average thermal conductivity, insufficient to prevent drawbacks in case of production stops, or
- coatings made of syntactic materials consisting of hollow balls containing a gas and withstanding the outside pressure, embedded in binders such as concrete, an epoxy resin, etc., whose conductivity is lower than that of compact materials, but which are much more expensive.

The pipe carrying the fluids can also be protected by means of an external pipe withstanding the hydrostatic pressure. A low thermal conductivity heat insulator left at atmospheric pressure or placed under vacuum, with partitions at regular intervals for safety reasons, is for example interposed in the annular space between the pipes.

It is also well-known to interpose, between the pipe and a deformable protective covering, an absorbent matrix sheathing the pipe, impregnated with a quasi-incompressible liquid/solid phase-change material at a fusion temperature above that of the surrounding medium and lower than that of the fluids circulating in the pipe.

Phase-change materials (PCM) behave like heat accumulators. They reversibly release this energy during their solidification (crystallization) or absorb this energy during fusion. These materials can therefore allow to increase the duration of production stops without pipe clogging risks through premature cooling of the pipe content. Known examples of phase-change materials are the chemical compouns of the $C_nH_{2n+2}$ alkane series such as, for example, paraffins ($C_{12}$ to $C_{60}$), which offer a good compromise between the thermal and thermodynamic properties (fusion temperature, latent heat of fusion, thermal conductivity, heat-capacity rate) and the cost. These compounds are thermally stable in the working temperature range considered, and they are compatible with a use in a marine environment on account of their water insolubility and of their very low toxicity level. They are therefore well suited for thermal insulation of deep-sea pipes for example.

The state change temperature of these phase-change materials is linked with the number of carbon atoms of the hydrocarbon chain and it can therefore be adapted for a particular application. In order to obtain a phase change around 30° C., a mixture of mainly $C_{18}$ paraffins can for example be used, such as Limpar 18-20 marketed by the CONDEA Augusta S.p.A. company.

It is also possible to consider using waxes, normal paraffins, very weakly branched (1 or 2 branches) long chained isoparaffins ($C_{30}$–$C_{40}$), long chained branched alkylcycloalkanes or long chained branched alkylaromatics, also weakly branched, fatty alcohols or fatty acids.

Above their fusion temperature Tf, phase-change materials (PCM) are in the liquid state and their viscosity is low. In order to overcome this drawback, which can be particularly disadvantageous in certain applications, notably for the manufacture of double-walled vessels or of energy storage drums, it is well-known to add a thickening agent such as silica to solidify them and to prevent leaks.

Another drawback of phase-change materials (PCM) is that their viscous liquid state favours convection heat losses.

SUMMARY OF THE INVENTION

The process according to the invention allows to produce a material or a product based on quasi-incompressible phase-change materials (PCM) having a low thermal conductivity at a temperature above their fusion temperature Tf.

It comprises combining with a phase-change material a thickening agent selected to greatly reduce the thermal convection at a temperature above the fusion temperature of the phase-change material.

According to an embodiment, the process comprises using a thickening agent dispersed in the phase-change material.

According to another embodiment, the process comprises using a thickening agent forming a gelled structure with the phase-change material.

The product based on low thermal conductivity phase-change materials (PCM) according to the invention comprises in combination a thickening agent selected to greatly reduce the thermal convection at a temperature above the fusion temperature of the phase-change material.

According to an embodiment, the product comprises in combination a phase-change material (PCM) and at least one metallic soap, this combination being obtained by action of bases on fatty acids or fatty matter.

According to another embodiment, the product comprises in combination a phase-change material (PCM) and complex aluminium, calcium or lithium soaps obtained by in-situ neutralization of dissymmetrical acids.

According to another embodiment, the product comprises in combination a phase-change material (PCM) and at least one inorganic thickener (graphite, hydrophobic silica gel, silico-aluminates rendered oleophilic, etc.).

According to another embodiment, the product comprises in combination at least one organic or organo-metallic thickener of aromatic polyurea type or coloured pigments, dispersed in a phase-change material (PCM).

The product can possibly include antioxidant or antibacterial agents, corrosion inhibitors or an insoluble-filler intended to adjust the density or the thermal conductivity thereof, additives intended to improve the stability thereof or a solvent intended to control the viscosity.

The product according to the invention finds applications for thermal insulation in general. It can be applied in particular for thermal insulation of hydrocarbon transport pipes, where it is used as a direct coating or interposed (injected) between the pipes and an external protective covering.

Other features and advantages of the process and of the material produced according to the invention, as well as application examples, are described hereafter.

DETAILED DESCRIPTION

As mentioned above, the process consists in dispersing, in a phase-change material (PCM), an insoluble thickening or gelling agent selected to reduce both the viscosity of the PCM and the thermal convection of the PCM in the liquid state, so as to form a blocked-convection insulating substance having a half-fluid to solid consistency.

The liquid component forming the continuous phase can be a mixture of chemical compounds of the $C_nH_{2n+2}$ alkane series such as, for example, ($C_{12}$ to $C_{60}$) paraffins or waxes, normal paraffins, very weakly branched (1 or 2 branches) long chained isoparaffins ($C_{30}$–$C_{40}$), long chained branched alkylcycloalkanes or long chained branched alkylaromatics, fatty alcohols or fatty acids. The liquid component preferably represents 70% to 99.5% of the mass of the product.

The thickening agent forming the disperse solid phase can be of organic nature (aromatic ureas), organometallic (alkaline or alkaline-earth soaps) or purely inorganic (silica, silico-aluminates (bentonite) rendered oleophilic by grafting an organic chain preferably comprising 12 to 24 carbon atoms).

The thickeners generally come in the form of fibres, crystals, or lamellar or spherical particles, with very variable dimensions according to their chemical nature and to their preparation mode.

According to the nature of the thickeners, a composition of gelled or disperse structure is obtained.

In the case of a gelled structure, the elementary particles of the thickening agent form, within the product, a coherent three-dimensional network (entangled fibres), with formation of internal bond strengths. The liquid phase-change material (PCM) is kept in the network by capillary action.

In the case of a disperse structure, the elementary particles of the thickening agent are suspended in the PCM. The dispersion is of colloidal type. The stability of the thickener suspension depends on the dimensions and on the density of the particles, on the viscosity of the medium and above all on the inter-particle forces that allow the system to be kept in equilibrium.

The efficiency of a blocked-convection phase-change material (BC-PCM) thus depends on four main parameters: the thickener concentration, the elementary dimensions of the thickener, the solvent power of the PCM towards the thickener and the dispersion forces. A wise combination of these parameters allows to optimize the insulating power of the BC-PCM at temperatures above the fusion temperature Tf of the PCM. Various combinations are also possible.

EXAMPLES OF COMPOSITIONS ACCORDING TO THE NATURE OF THE THICKENING AGENTS

1—The blocked-convection PCM can be based on metallic soaps: lithium soaps, calcium soaps, sodium soaps, aluminium soaps, or mixed lithium/calcium or calcium/sodium soaps. They are obtained in the presence of liquid PCM, either by neutralization of fatty acids, or by saponification of fatty matter by the following bases: lime, lithium hydroxide, soda or aluminium hydroxide for example.

2—The blocked-convection PCM can also be based on complex aluminium, calcium or lithium soaps, obtained by in-situ neutralization of dissymmetrical acids in the presence of liquid PCM.

3—The blocked-convection PCM can also be formed without soap, from:

3a—inorganic thickeners such as graphite or carbon black, a hydrophobic silica gel or oleophilic silico-aluminates (montmorillonite, bentonite, etc.);

3b—organic or organo-metallic thickeners such as sodium terephthalate or aromatic polyureas or coloured pigments (indanthrene, copper phthalocyanine).

These compositions obtained without soap are formed by dispersion of inorganic or organic compounds in the liquid PCM. These compounds are insoluble in the liquid phase (PCM) at any temperature.

Additives

The following compounds can also be added to the compositions for certain applications in order to provide certain specific properties.

1—Soluble Additives a) Antioxidant additives can be added essentially when the product (blocked-convection PCM) undergoes a temperature rise during operation. The most commonly encountered additives are phenol derivatives (dibutylparacresol, etc.), sulfur-containing phenol derivatives and aromatic amines (phenyl • or • naphtylamine or alkyl amine diphenyls). These antioxidants retard the oxidation process through their inhibiting action towards free radical formation or their destructive action towards the hydroperoxides formed;

b) antibacterial agents;

c) corrosion inhibitors;

c1) soluble in the liquid PCM, consisting of chemical compounds of polar nature, which are readily adsorbed on the metallic surface by forming a hydrophobic film (fatty amines, alkaline-earth sulfonate, etc.);

c2) water soluble and acting by passivation of the water phase (sodium nitrite for example);

d) structure-modifying additives of polar nature (water, acetone, glycerol, etc.), intended to stiffen the structure of the entangled soap fibres or of the thickener and to improve the stability of the dispersion of the gelling agent in the PCM.

2—Fillers

Insoluble fillers such as hollow glass microballs, fly ash, macroballs, hollow fibres, etc., can be added to the BC-PCM in order to adjust its density and/or its thermal conductivity.

3—Solvents

In order to fluidity the blocked-convection PCM, it is possible to use hydrocarbons of petroleum origin such as hydrocarbon-containing solvents, distillation cuts, predominantly aromatic, naphthenic or paraffinic oils obtained through solvent extraction processes or deep hydrotreating processes, solvents or cuts obtained by means of hydroisomerization of paraffinic extracts of petroleum origin or Fischer-Tropsch synthesis, solvents and compounds obtained by synthesis such as, for example, ester type oxygenated compounds, synthesis hydrocarbons such as hydrogenated polyolefins, etc.

The blocked-convection PCM thus consists of a combination of 70 to 99.5% by mass of liquid PCM and of 0.5 to 30% thickener, to which additives (<10%), fillers (5 to 60%) and solvents (0.2 to 5%) are possibly added.

Formulation Examples

The following product, consisting of 90% PCM, 9.5% lithium soap and 0.5% antioxidant, can be used as a blocked-convection PCM. Another composition can comprise for example 90% oil, 2.5% dispersant (water, acetone, polar products), 7% oleophilic bentone and 0.5% antioxidant.

Applications

The blocked-convection PCM described above can be used for example for thermal insulation of subsea pipes.

The aforementioned patent application FR-98/16,791 describes a device for thermal insulation of subsea pipes intended to be laid on the bottom at a great depth. The device comprises an external coating consisting of a quasi-incompressible liquid/solid phase-change material (PCM) having an intermediate fusion temperature between the temperature of the effluents circulating in the pipe(s) and the temperature of the outside environment, and an absorbent matrix surrounding the pipe(s) as closely as possible. The pipes and their coating are placed in a resistant and deformable protective covering.

The external coating consisting of the PCM-impregnated matrix described in the prior document can be advantageously replaced here by one of the blocked-convection PCM described above, which results in an improvement of the thermal insulation of the pipes and a simplification of the operations of setting around the pipe(s), by pumping for example at a temperature above the fusion temperature Tf, very appreciable when the assembly of pipes to be insulated is complex.

Applications of the material for thermal insulation of pipes carrying fluids, notably hydrocarbons, have been described. It is however clear that such a material can also be used for any other application where it is desired to have a very low thermal conductivity combined with an energy release.

The invention claimed is:

1. A process for producing a thermal insulant material based on phase-change materials (PCM), comprising combining a thickening agent with a phase-change material comprising a mixture of chemical compounds of the alkane series, the thickening agent being selected to reduce thermal convection at a temperature above a fusion temperature of the phase change material, and forming, with the phase-change material, a gelled structure.

2. A material based on phase-change materials (PCM), comprising in combination, a phase-change material (PCM), and a thickening agent comprising at least one organic or organo-metallic thickener or an aromatic polyurea or coloured pigments, dispersed in the phase-change material (PCM) and selected to reduce thermal convection at a temperature above a fusion temperature of the phase-change material, and at least one insoluble filler intended to adjust density or the thermal conductivity thereof.

3. A material based on phase-change materials (PCM) comprising in combination, a phase-change material (PCM) and a thickening agent selected to reduce thermal convection at a temperature above a fusion temperature of the phase-change material, the thickening agent comprising at least one metallic soap, and the at least one metallic soap being obtained in the phase-change material by action of bases on fatty acids or fatty matter, and further comprising at least one soluble additive acting as an antioxidant or antibacterial additive or a corrosion inhibitor or a substance modifying a structure thereof.

4. A process for thermal insulation of pipes carrying fluids, comprising coating the pipes with a material comprising, in combination, a phase-change material (PCM), comprising a mixture of chemical compounds of the alkane series, and a thickening agent selected to reduce thermal convection at a temperature above a fusion temperature of the phase-change material, and forming, with the phase change material, a gelled structure.

5. The process as claimed in claim 4, comprising coating the pipes by interposing the material between the pipes and an external protective covering.

6. The process as claimed in claim 4, comprising injecting the material into a space between the pipes and an external protective covering.

7. The process as claimed in claim 6, wherein the pipes are deep-sea subsea pipes carrying hydrocarbons.

8. A material based on phase-change materials (PCM) comprising, in combination a phase-change material (PCM) and a thickening agent selected to greatly reduce thermal convection at a temperature above a fusion temperature of the phase-change material, the thickening agent comprising complex aluminium, calcium or lithium soaps obtained by in-situ neutralization of dissymmetrical acids, and further comprising at least one soluble additive acting as an antioxidant or antibacterial additive or a corrosion inhibitor or a substance modifying a structure thereof.

9. A material based on phase-change materials (PCM) comprising, in combination, a phase-change material (PCM), at least one organic or organo-metallic thickener or an aromatic polyurea or coloured pigments, dispersed in the phase-change material (PCM) a thickening agent selected to reduce thermal convection at a temperature above a fusion temperature of the phase-change material, and at least one solvent intended to control viscosity.

* * * * *